United States Patent [19]
Mansur

[11] Patent Number: 5,941,316
[45] Date of Patent: Aug. 24, 1999

[54] STALK PULLER AND CHOPPER ASSEMBLY

[75] Inventor: Peter Lloyd Mansur, New South Wales, Australia

[73] Assignee: Great Western Corporation Pty Ltd., Queensland, Australia

[21] Appl. No.: 08/876,022

[22] Filed: Jun. 13, 1997

[30] Foreign Application Priority Data

Jun. 14, 1996 [AU] Australia .................................. PO0478
Feb. 14, 1997 [AU] Australia .................................. PO5100

[51] Int. Cl.⁶ .................................................. A01D 13/00
[52] U.S. Cl. ................................ 171/58; 171/55; 56/502; 56/503; 241/101.763; 241/236; 241/186.4
[58] Field of Search .................................. 171/50, 51, 53, 171/55, 58, 62, 63, 24; 56/502, 503, 505, 16.4 R; 460/113, 112; 241/101.742, 101.763, 236, 186.4

[56] References Cited

U.S. PATENT DOCUMENTS

| | | | |
|---|---|---|---|
| 2,337,355 | 12/1943 | Spell | 171/62 |
| 2,530,466 | 11/1950 | Heimark | 241/186.4 |
| 3,770,064 | 11/1973 | Scarnato et al. | 171/58 |
| 4,026,092 | 5/1977 | Wehde | 171/58 X |
| 4,350,207 | 9/1982 | Ben-Dor | 171/58 |
| 4,397,136 | 8/1983 | McLeod | 56/503 X |
| 4,588,033 | 5/1986 | Orthman | 171/62 |
| 4,751,812 | 6/1988 | Lubetzky et al. | 171/58 X |

Primary Examiner—Victor Batson
Attorney, Agent, or Firm—Fitzpatrick, Cella, Harper & Scinto

[57] ABSTRACT

A stalk puller and chopper assembly 10 drawn behind a tractor 11, the stalk puller and chopper assembly comprising a puller means in the form of a pair of contra-rotating rubber wheels 12 and 13 on a shaft 21. The wheels are located upstream of a feeder means comprising a pair of guide plates 14 and 15 and an array of toothed feeder blades 16 mounted on a feeder shaft 17. The guide plates co-operate with the wheels and the rotating feeder blades 16 to deliver stalks extracted by the wheels to a downstream chopper assembly 19 where chopper blades 18 on shaft 22 shred the stalks which are then discharged rearwardly at 20 in the form of mulch. As can be seen the stalks are controllably delivered sideways into the choppers. The clearance between the cutter blades 18 and the anvils of the toothed feeder blades is exaggerated in the drawings with the usual clearance being about 2 mm. The toothed feeder blades rotate at approximately 100 RPM while the cutter blades rotate at approximately 900 RPM, the interaction between the blades and the toothed wheels and the stalks being chopped results in a self cleaning action of the toothed feeder blades and cutter blades thereby inhibiting any clogging.

1 Claim, 7 Drawing Sheets

STALK PULLER AND CHOPPER ASSEMBLY

BACKGROUND OF THE INVENTION

1. Field of the Invention

THIS INVENTION relates to a stalk puller and chopper assembly and in particular but not limited to an assembly suited to pulling and mulching cotton stalks.

2. Description of the Prior Art

The following patents deal with stalk pulling apparatus of various kinds and also apparatus employing cutters to provide mulching.

Australian Patent No. 652375 to ARIZONA DRIP SYSTEMS INC et al describes a stalk puller employing self driven discs but there is no arrangement to mulch the stalks once they are extracted. The stalks must be gathered and burned or mulched separately.

Australian Patent Application No 47427/93 to QUICK describes a cotton stalk puller where belts extract stalks and then a series of conveyors and screws deliver the stalks to a hammer mill for mulching. This puller is complex and expensive to make and maintain and the components are prone to become clogged with dirt.

Australian Patent No. 541023 and Australian Patent Application No. 80108/82 both to S. BEN-DOR LIMITED describe a stalk extracting and shredding implement where stalks are extracted by a pair of wheels, the stalks are then transferred to an oblique conveyor then to a set of four feeder rollers which feed the stalks into a shredder where a rotating shredder chops the stalks against stationary blades. This particular unit, as in the case of the previous unit is expensive to make and maintain and the components, particularly the stationary cutter blades are prone to become clogged and ineffective.

Australian Patent No. 657649 to STOKES describes a trash plant stem shredding apparatus which is quite similar to the S. BEN-DOR unit in that it employs wheel type extractors and feed rollers feeding the stalks into a chopper; but a different geometry is employed. Nevertheless the chopper used is still prone to become clogged.

Australian Patent Application No. 55037/86 to McLEAN describes a stalk puller and chopper assembly employing an arrangement similar to the S. BEN-DOR arrangement but the shredder employs two overlapping contra-rotating shredder blades. The stalks are still fed adjacent fixed cutters, in this case formed by openings in a shroud, the edges of the openings effectively provide fixed blades against which cutting takes place. This apparatus is also prone to become clogged.

Australian Patent Application No. 49124/93 describes a shredder where nib rollers mounted on a tool bar in front of contra-rotating shredders pluck plants which are then shredded by the following shredders. This machine does not exercise any control over shredding.

Australian Patent No. 485,855 describes a stalk puller and shredder employing cone shaped feeders delivering stalks to a chopper assembly.

UK Patent No. 2245472 describes a chopping machine employing contra-rotating intersecting cutting blades which also link with spaced counter-cutters having disc shaped notched blades. The cutting blades have pivotally mounted Y-shaped ends that fit either side of the counter-cutters.

One major problem with the prior art arrangements is that the cutters are prone to become clogged with soil thereby reducing efficiency of the chopper. Another problem of maintenance and expense arise due to the complexity, the machines usually involve chains, conveyors and feed rollers all adding to costs.

In addition there is little or any control over the orientation of stalks delivered to the cutters so cutting efficiency is compromised.

SUMMARY OF THE INVENTION

It is an object of the present invention to provide a stalk puller and chopper assembly where a chopper assembly having a plurality of chopper blades is operatively disposed relative to a feeder where the feeder interacts directly with the chopper by evenly feeding stalks sideways rather than endwise into the chopper, the feeder having a plurality of non-stationary anvils against which chopper blades chop the stalks, the relative disposition, relative speed of rotation of the anvils and chopper blades and position of the stalks during the chopping action results in a self cleaning of the anvils and blades in order to inhibit clogging.

In one preferred form the stalk puller and chopper assembly comprises a puller means located upstream of a feeder means, the feeder means having an upstream end receiving stalks from the puller means and a downstream end delivering the stalks to the chopper, the downstream end of feeder and chopper being arranged in overlapping disposition so that the feeder provides non-stationary cutting anvils for the chopper, the action of the mobile cutting anvils and the chopper serving to inhibit clogging of the chopper.

The puller means preferably comprises a pair of contra-rotating inclined wheels. The feeder means preferably comprises a guide means feeding stalks into an array of rotating toothed feeder blades and there being associated therewith contra-rotating cutting blades arranged in alternating interdigital relation with the feeder blades in order to chop stalks carried by the feeder blades.

The axis of rotation of the puller wheels, the feeder blades and the cutter blades are preferably parallel.

Preferably there are two pairs of cutting blades for each feeder blade with each a pair of cutting blades being spaced so that the feeder blades pass between them in closely spaced relation.

In a further preferred embodiment the present invention resides in a modular stalk puller and chopper assembly comprising spaced modular assemblies supported by spaced wheels, each modular assembly comprising a frame module holding a puller shaft module, the puller shaft module driving contra-rotating puller wheels at a lower end thereof, a feeder shaft module carrying an array of feeder blades and a cutter shaft module carrying an array of cutter blades, the modules being arranged for operative travel of a stalk from the puller wheels through the feeder blades in a sideways orientation into the cutter blades.

In another preferred embodiment the present invention provides a compact stalk puller and chopper assembly comprising a frame, a puller shaft driving contra-rotating puller wheels at a lower end thereof, a feeder shaft having an array of feeder blades and a cutter shaft having an array of cutter blades, the feeder shaft and cutter shaft rotating about respective axes of rotation, the axis of rotation of the feeder shaft being disposed generally centrally in the frame between and behind the puller wheels and the axis of rotation of the cutter shaft being offset from and marginally outside the axis of rotation of the feeder shaft.

BRIEF DESCRIPTION OF THE DRAWINGS

In order that the present invention can be more readily understood and be put into practical effect reference will now be made to the accompanying drawings which illustrate preferred embodiments of the present invention and wherein.

DESCRIPTION OF THE PREFERRED EMBODIMENTS

Figure 1:
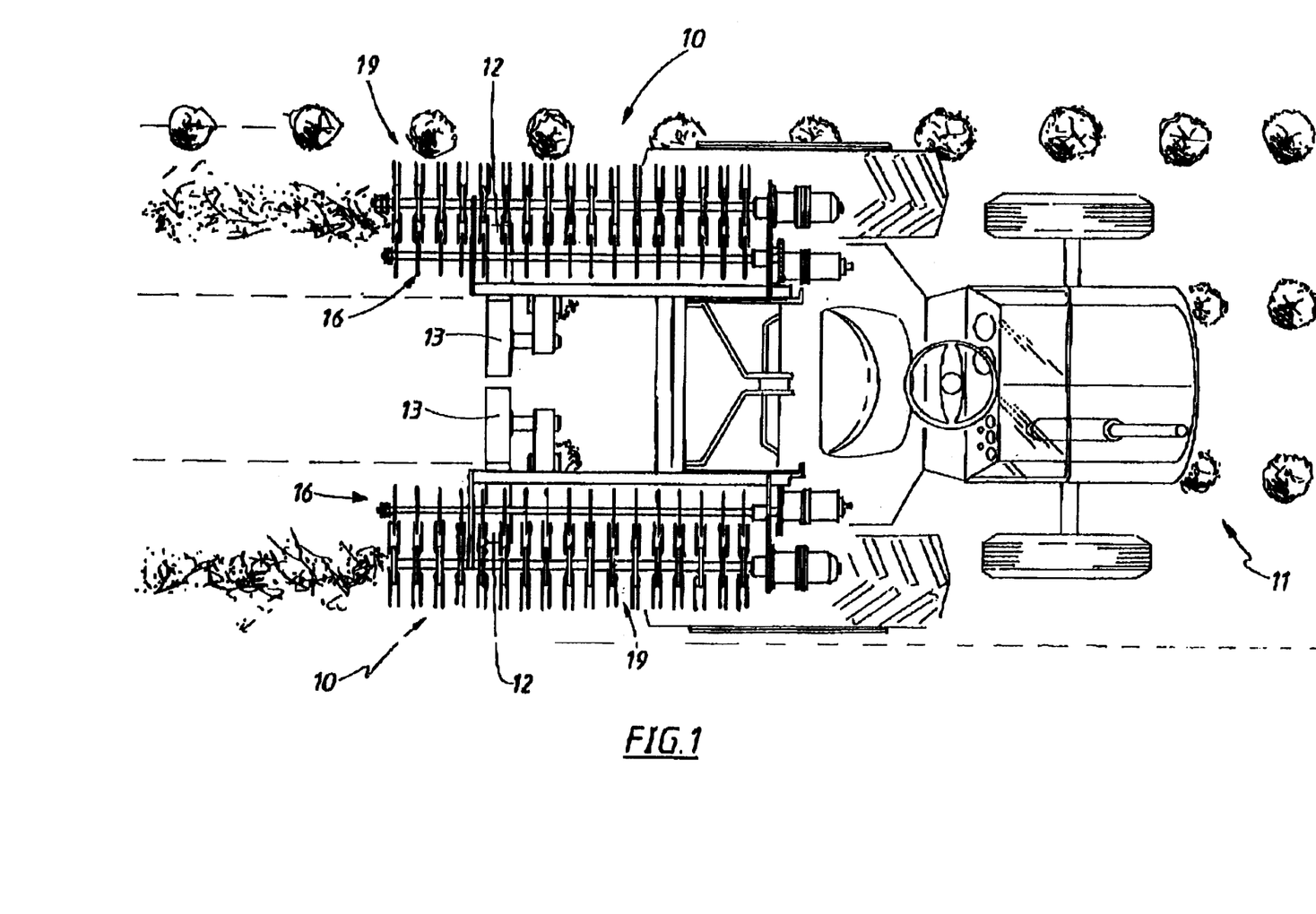
FIG. 1 is a plan view illustrating operation of the row unit comprising a pair of stalk puller and chopper assemblies according to the present invention shown drawn behind a tractor.
Figure 2:
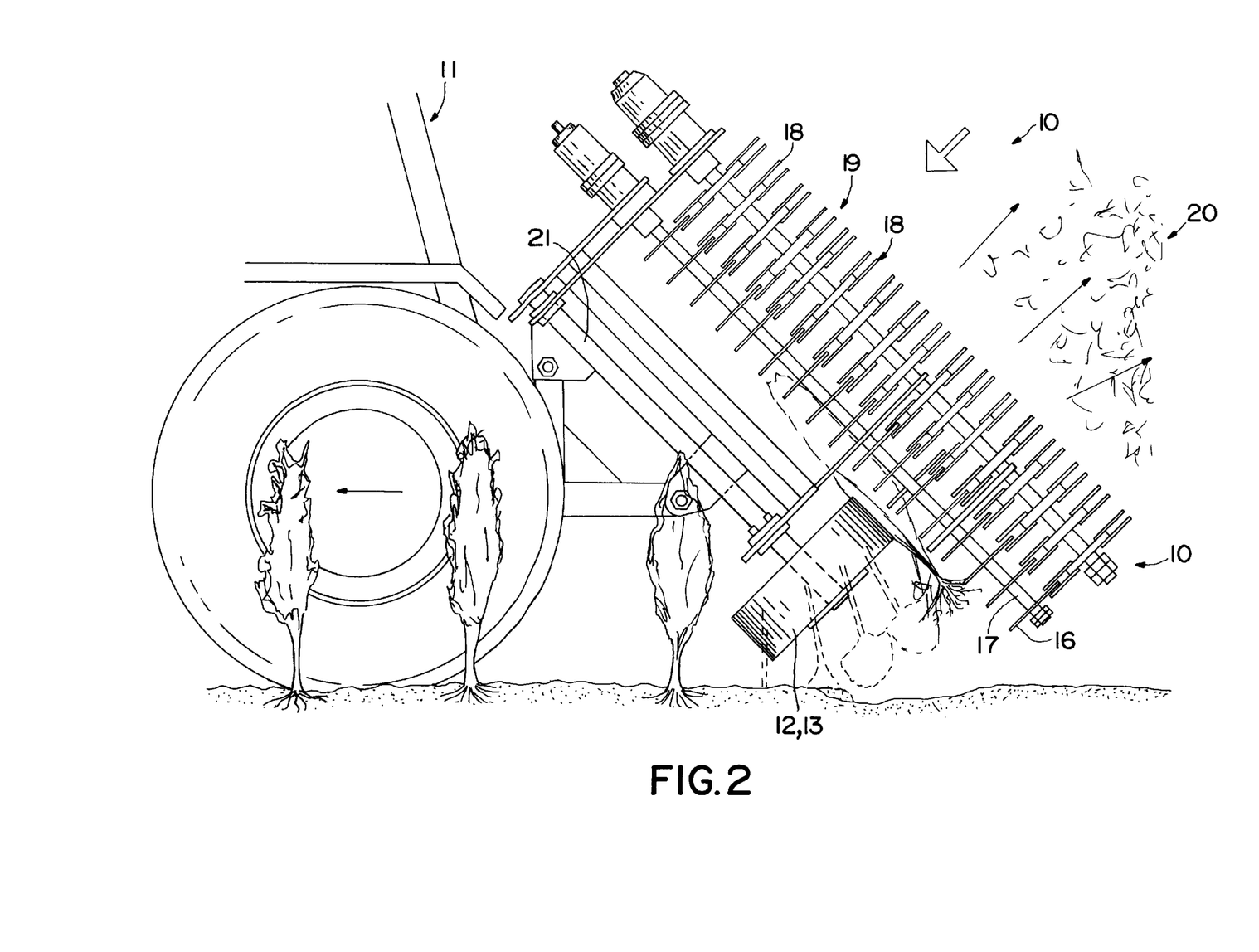
FIG. 2 is a side view illustrating a stalk puller and chopper assembly according to the present invention.
Figure 3A:
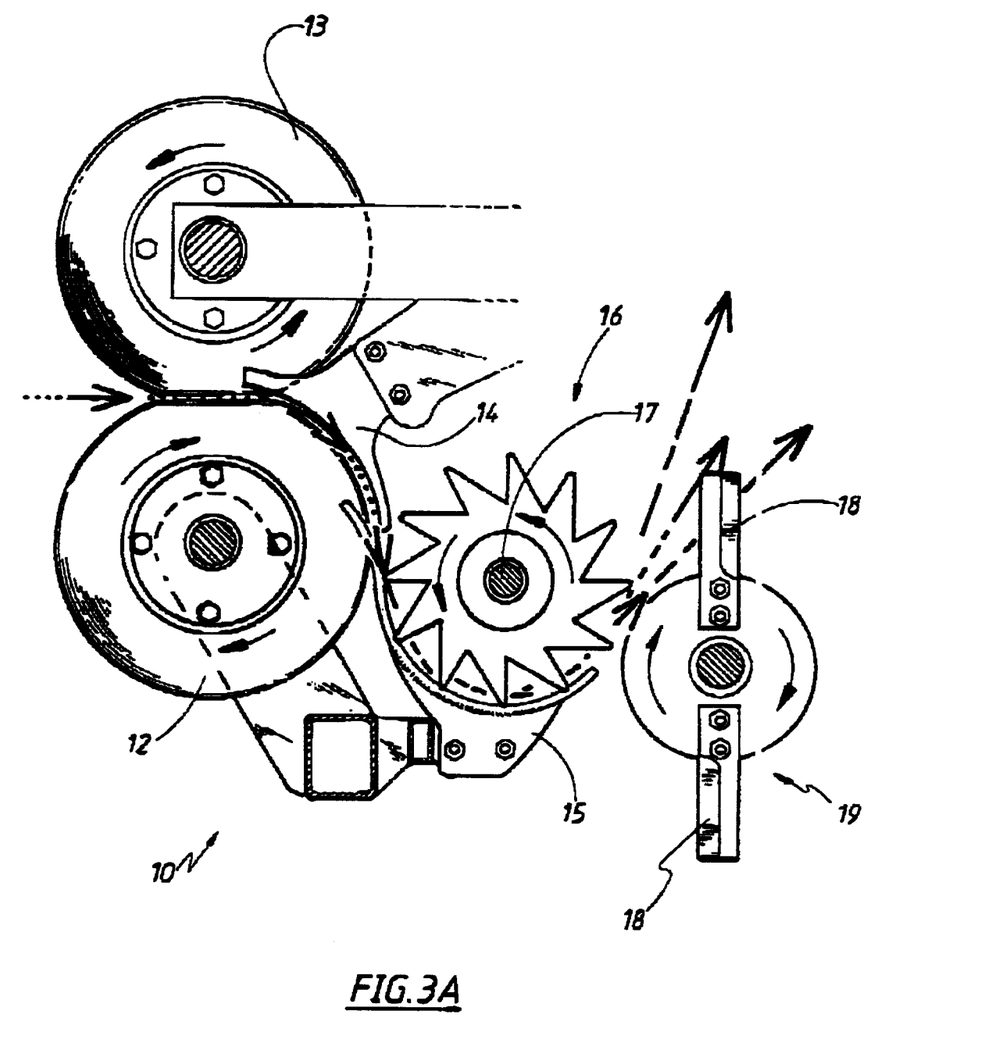
FIG. 3A is a section through a typical stalk puller and chopper assembly of the present invention illustrating the passage of a stalk through the assembly.

Referring to the drawings and initially to FIG. 1 there is illustrated a stalk puller and chopper assembly 10 drawn behind a tractor 11, the stalk puller and chopper assembly comprising a puller means in the form of a pair of contra-rotating rubber wheels 12 and 13 on a shaft 21. The wheels are located upstream of a feeder means comprising a pair of guide plates 14 and 15 (see FIG. 3A) and an array of toothed feeder blades 16 mounted on a feeder shaft 17. The guide plates cooperate with the wheels and the rotating feeder blades 16 to deliver stalks extracted by the wheels to a downstream chopper assembly 19 where chopper blades 18 on shaft 22 shred the stalks which are then discharged rearwardly at 20 in the form of mulch. As can be seen the stalks are controllably delivered sideways into the choppers. The clearance between the chopper blades 18 and the anvils of the toothed feeder blades is exaggerated in the drawings with the usual clearance being about 2 mm. The toothed feeder blades rotate at approximately 100 RPM while the cutter blades rotate at approximately 900 RPM, the interaction between the blades and the toothed wheels and the stalks being chopped results in a self cleaning action of the toothed feeder blades and cutter blades thereby inhibiting any clogging.

The stalk puller and chopper assembly described above is a relatively large machine and efforts to increase its capacity, to say four rows, by scaling it up to include extra pullers, feeders and choppers results in a machine that is too cumbersome.

In addition to this, the manufacturing process cannot readily adapt to packaging the machine for transport particularly for export purposes.

In the embodiment described below the stalk puller and chopper assembly is configured where its capacity is increased but where the assembly has a more compact construction.

The previous embodiment is a dual row unit whereas the following embodiment provides for four rows by providing a multi-row stalk puller and chopper assembly of modular construction to facilitate manufacture and assembly.

As can be seen the unit illustrated in FIG. 1 is suspended on a three point linkage to the tractor 11 and in the embodiment of FIG. 1 two assemblies can be used to extract spent plants from two rows behind the tractor.

Figure 3B:
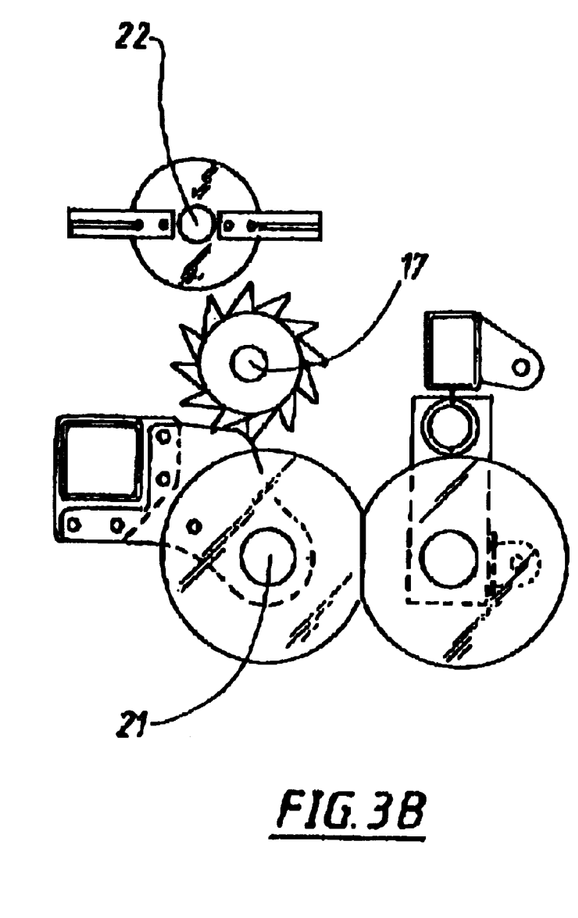
FIG. 3B is a schematic plan view showing the relative disposition of components of the two row stalk puller and chopper assembly of the embodiments of FIGS. 1–3A.

The position of the shafts 17, 21 and 22 is shown in FIG. 3B and as can be seen this arrangement provides a relatively wide assembly.

Figure 3C:
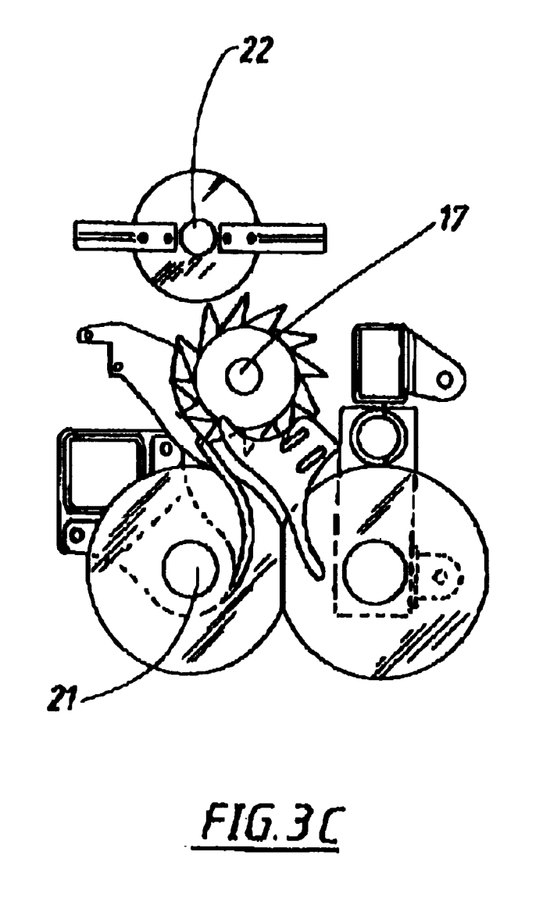
FIG. 3C is a view similar to FIG. 3B but showing the repositioning of the feeder and cutter shafts to provide a more compact modular assembly in order to cater for more rows and simpler modular construction.

FIG. 3C illustrates an alternative assembly where the shafts 21, 17 and 22 have been repositioned so that the assembly is narrower and therefore more compact so that four such units can be placed side by side. The units can be mounted on a supporting wheel assembly to increase the capacity of the unit to four rows.

Figure 6:
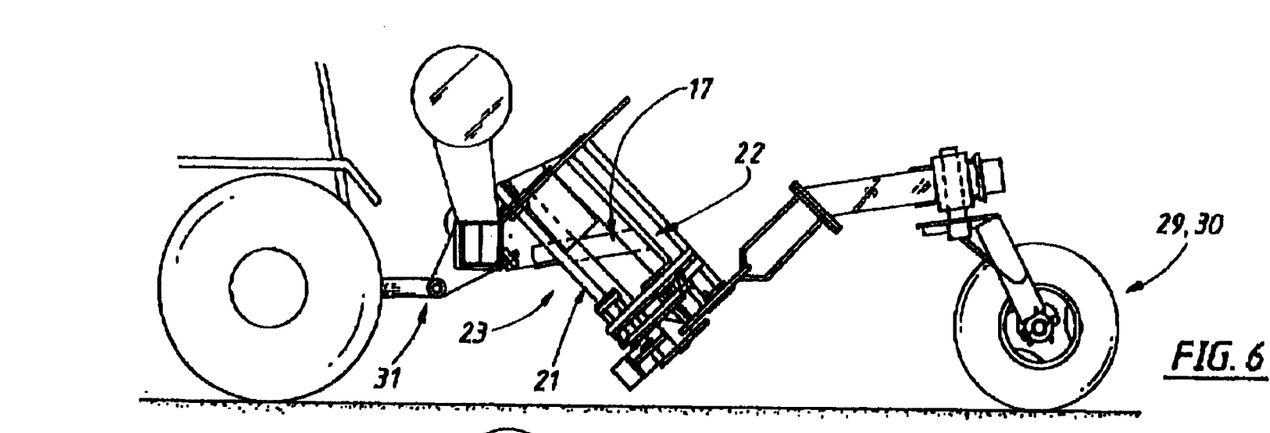
FIGS. 6 and 7 are schematic side views illustrating a four row unit made up of modules showing the unit in its operative stalk pulling position and in its transport position respectively.
Figure 7:
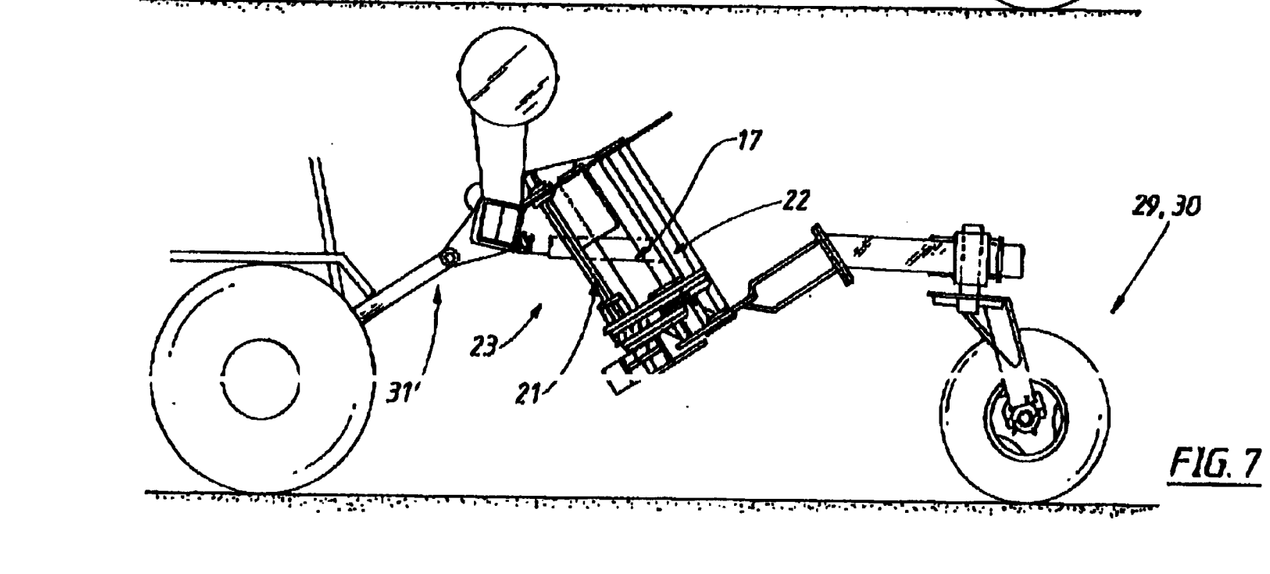

This embodiment of the invention as compared to FIG. 1 is illustrated in FIGS. 6 and 7 where the position of the wheel assembly is shown. The operation of the contra-rotating puller wheels, feeder and cutters remains unchanged notwithstanding the repositioning of the shafts 17, 21 and 22.

Figure 4A:
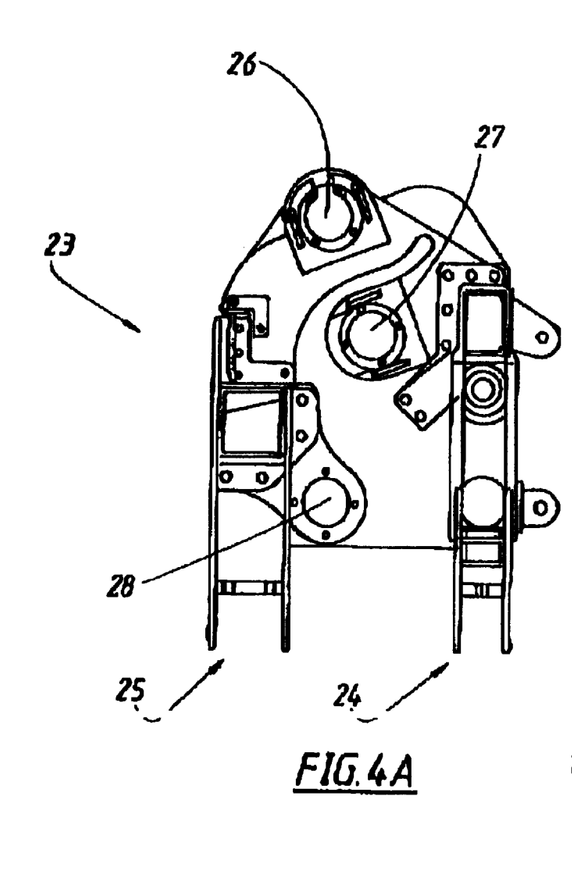
FIG. 4A is a plan view of a frame module corresponding to the assembly of FIG. 3C.
Figures 4B, 4C:
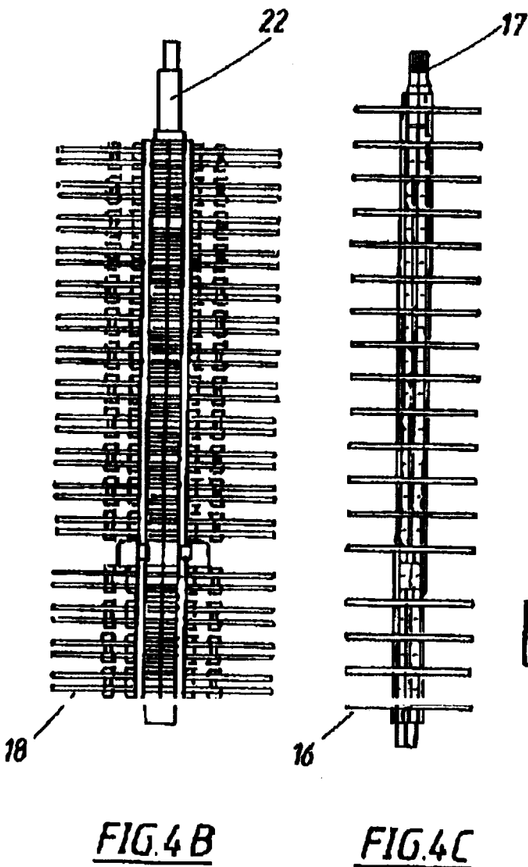
FIGS. 4B, 4C and 4D are drawings illustrating a cutter shaft module, feeder shaft module and puller shaft module respectively for assembly into the frame module of FIGS. 4A and 5.
Figure 4D:
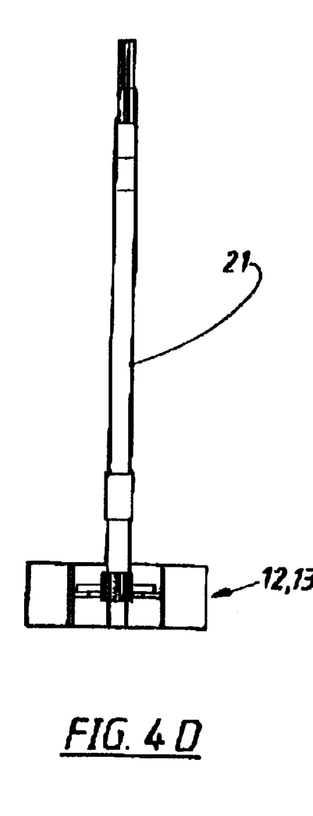
Figure 5:
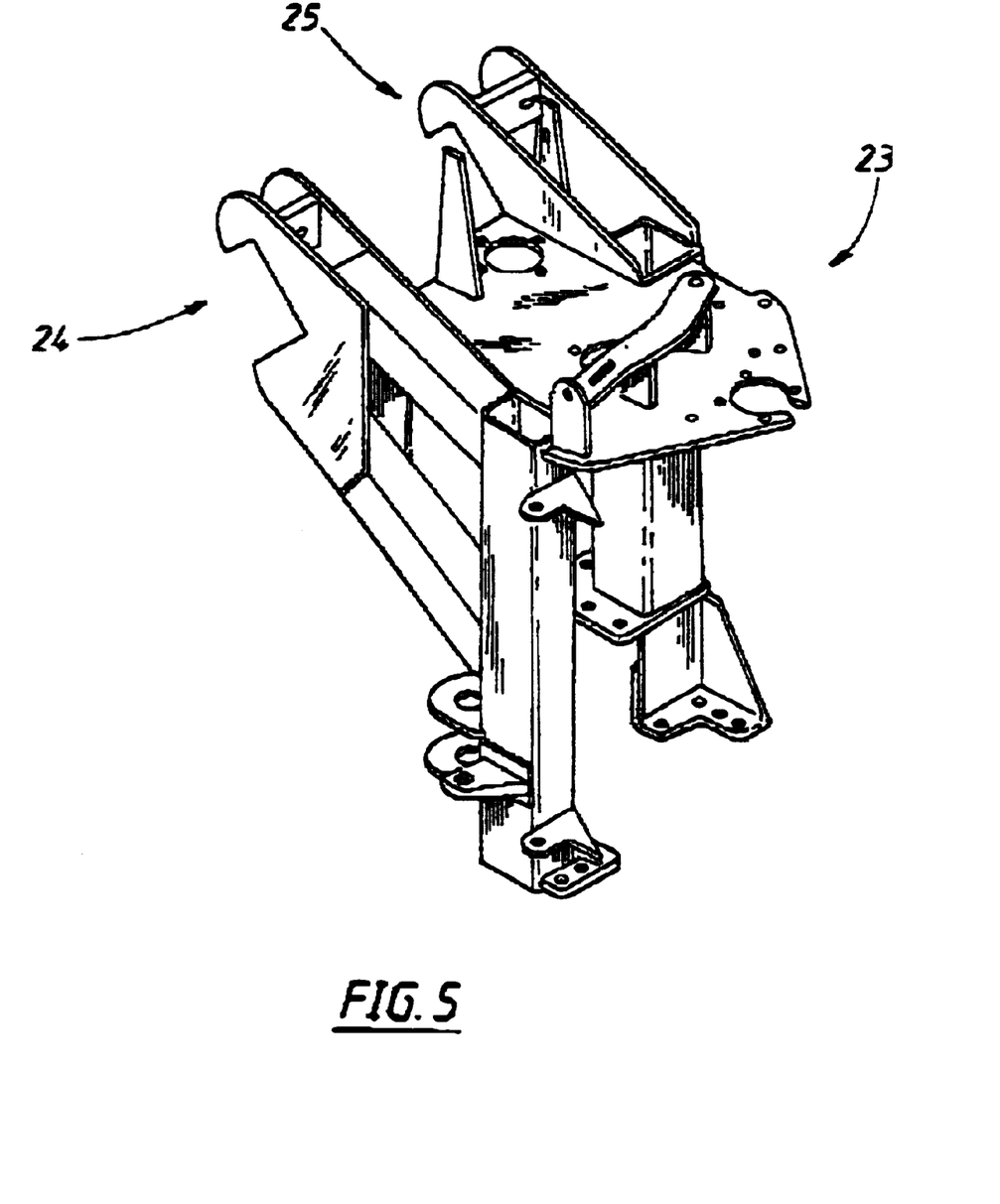
FIG. 5 is a perspective view of a frame module corresponding to the plan view of FIG. 4A.

In order to facilitate assembly of a stalk puller and chopper assembly each stalk puller and chopper assembly is made from modular components and these are illustrated in FIGS. 4A, 4B, 4C, 4D and 5 where FIGS. 4A and 5 illustrate a frame module, FIG. 4B illustrates a cutter shaft module, FIG. 4C illustrates a feeder shaft module and FIG. 4D illustrates a puller shaft module. It will be appreciated that one of the puller wheels is mounted as an idler wheel. As can be seen in FIGS. 4A and 5, the frame module 23 hooks over a tool bar using the hook type attachments 24 and 25 and includes provision for mounting of the respective modules of FIGS. 4B, 4C and 4D at 26, 27 and 28 respectively. FIG. 4A shows the respective bearings in place at 26 and 27.

Four of these modules are stacked side by side as illustrated in FIGS. 6 and 7 with a pair of spaced wheels one of which can be seen in FIGS. 6 and 7. The arrangement utilises a two point linkage illustrated at 31 to move the puller and chopper assembly from its operative pulling position illustrated in FIG. 6 to a raised transport position illustrated in FIG. 7.

Whilst the above had been given away by way of illustrative example of the present invention many modifications and variations will be apparent to those skilled in the art without departing from the broad ambit and scope of the invention as set forth in the appended claims.

I claim:

1. A stalk puller and chopper assembly where a chopper assembly having a plurality of chopper blades is operatively disposed relative to a feeder having a plurality of feeder blades where the feeder interacts directly with the chopper assembly by evenly feeding stalks sideways rather than endwise into the chopper blades, the feeder having a plurality of non-stationary anvils against which the chopper blades chop the stalks, the relative disposition, relative speed of rotation of the anvils and chopper blades and position of the stalks during the chopping action results in a self cleaning of the anvils and chopper blades in order to inhibit clogging, the stalk puller and chopper assembly comprises a puller means for pulling at least one stalk and being located upstream of the feeder, the feeder having an upstream end receiving the stalks from the puller means and a downstream end delivering the stalks to the chopper assembly, the downstream end of the feeder and the chopper assembly being arranged in an overlapping disposition, and wherein there are two pairs of chopping blades for each of said plurality feeder blades with each pair of chopping blades being spaced so that the corresponding feeder blade passes between said each pair of chopping blades in a closely spaced relation.

* * * * *